(12) United States Patent
Kim

(10) Patent No.: US 12,462,884 B2
(45) Date of Patent: Nov. 4, 2025

(54) PAGE BUFFER CIRCUIT AND READ OPERATION METHOD OF MEMORY

(71) Applicant: SK hynix Inc., Gyeonggi-do (KR)

(72) Inventor: Jae Woong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 182 days.

(21) Appl. No.: 18/459,447

(22) Filed: Sep. 1, 2023

(65) Prior Publication Data

US 2024/0379177 A1    Nov. 14, 2024

(30) Foreign Application Priority Data

May 11, 2023 (KR) .................. 10-2023-0060998

(51) Int. Cl.
| | |
|---|---|
| G11C 16/26 | (2006.01) |
| G11C 7/10 | (2006.01) |
| G11C 16/08 | (2006.01) |
| G11C 16/34 | (2006.01) |

(52) U.S. Cl.
CPC ........ G11C 16/3459 (2013.01); G11C 7/1039 (2013.01); G11C 16/08 (2013.01); G11C 16/26 (2013.01)

(58) Field of Classification Search
CPC ... G11C 16/3459; G11C 7/1039; G11C 16/08; G11C 16/26; G11C 11/5642; G11C 16/0483; G11C 16/24; G11C 16/32; G11C 16/10
See application file for complete search history.

(56) References Cited

U.S. PATENT DOCUMENTS

| | | |
|---|---|---|
| 8,400,858 B2 | 3/2013 | Meir et al. |
| 2019/0115066 A1* | 4/2019 | Ramaraju ................ G11C 7/08 |
| 2021/0082490 A1* | 3/2021 | Ramaraju ............ G11C 11/565 |

FOREIGN PATENT DOCUMENTS

KR    10-2022-0124970 A    9/2022

* cited by examiner

*Primary Examiner* — Xiaochun L Chen
(74) *Attorney, Agent, or Firm* — IP & T GROUP LLP

(57) ABSTRACT

Disclosed is a read operation method of a memory, and the read operation method may include evaluating a sensing node according to a voltage level of a bit line, sensing a voltage level of the sensing node after a first time elapses from a start of the evaluation, and sensing the voltage level of the sensing node after a second time longer than the first time elapses from the start of the evaluation.

10 Claims, 14 Drawing Sheets

PAGE BUFFER CIRCUIT AND READ OPERATION METHOD OF MEMORY

CROSS-REFERENCE TO RELATED APPLICATION(S)

This application claims priority under 35 U.S.C. § 119 to Korean Patent Application No. 10-2023-0060998, filed on May 11, 2023, the disclosure of which is incorporated herein by reference in its entirety.

BACKGROUND

1. Technical Field

Various embodiments of the present disclosure relate to a memory, and more particularly, to a read operation of the memory.

2. Related Art

With the recent trend of electronic appliances moving toward miniaturization, low power consumption, high performance, and diversification, memories capable of storing information in various electronic appliances such as a computer and a portable communication device have been demanded. Memories may be largely classified into volatile memories and non-volatile memories. Volatile memories have a high data processing speed, but have a disadvantage in that power must be continuously supplied to retain stored data, whereas non-volatile memories do not need to be continuously supplied with power to retain stored data, but have a low data processing speed.

In the case of the non-volatile memories, it is common to write 2 or more bits of data to one memory cell, which means that one memory cell has as many statuses as 2^(the number of written bits). That's why a read operation for discriminating the data written to the memory cell inevitably takes a lot of time. Therefore, a technique for quickly and accurately performing the read operation is required.

SUMMARY

In accordance with an embodiment of the present disclosure, a read operation method of a memory may include: evaluating a sensing node according to a voltage level of a bit line; sensing a voltage level of the sensing node after a first time elapses from a start of the evaluating; and sensing the voltage level of the sensing node after a second time longer than the first time elapses from the start of the evaluating.

In accordance with an embodiment of the present disclosure, a page buffer circuit may include: a sensing node; a first sensing latch configured to sense and store a voltage level of the sensing node at a first time point during an evaluation period of evaluating the sensing node according to a voltage level of a bit line; and a second sensing latch configured to sense and store the voltage level of the sensing node at a second time point during the evaluation period.

In accordance with an embodiment of the present disclosure, a read operation method of a memory may include: applying a first read voltage to a selected word line corresponding to a memory cell selected from a cell string; applying a pass voltage to unselected word lines corresponding to memory cells unselected from the cell string; a first evaluation operation of evaluating a sensing node according to a voltage level of a bit line connected to the cell string; a first sensing operation of sensing a voltage level of the sensing node during the first evaluation operation; transmitting a result of the first sensing operation to a first data latch; applying a second read voltage different from the first read voltage to the selected word line; pre-charging the sensing node; a second evaluation operation of evaluating the sensing node according to the voltage level of the bit line; a second sensing operation of sensing the voltage level of the sensing node during the second evaluation operation; a third sensing operation of sensing the voltage level of the sensing node at a different point in time from the second sensing operation during the second evaluation operation; transmitting a result of the second sensing operation to a second data latch; and transmitting a result of the third sensing operation to a third data latch.

In accordance with an embodiment of the present disclosure, a read operation method of a memory may include: applying, to a word line coupled to the memory cell, a read voltage belonging to a range between two from among the reference voltages; and sensing, during a single period of evaluating a sensing node coupled to the memory cell, the sensing node an M number of times at different time points to determine whether a threshold voltage of the memory cell is greater than each of the respective M number of neighboring ones from among the reference voltages, the neighboring reference voltages belonging to the range, wherein the read voltage is different from the neighboring reference voltages, and wherein M is an integer being two or greater.

DETAILED DESCRIPTION

Various embodiments of the present disclosure are directed to a memory capable of quickly and accurately performing a read operation.

According to embodiments of the present disclosure, it is possible to quickly and accurately perform the read operation of the memory.

Hereinafter, various embodiments according to the technical spirit of the present disclosure are described below with reference to the accompanying drawings.

Figure 1:
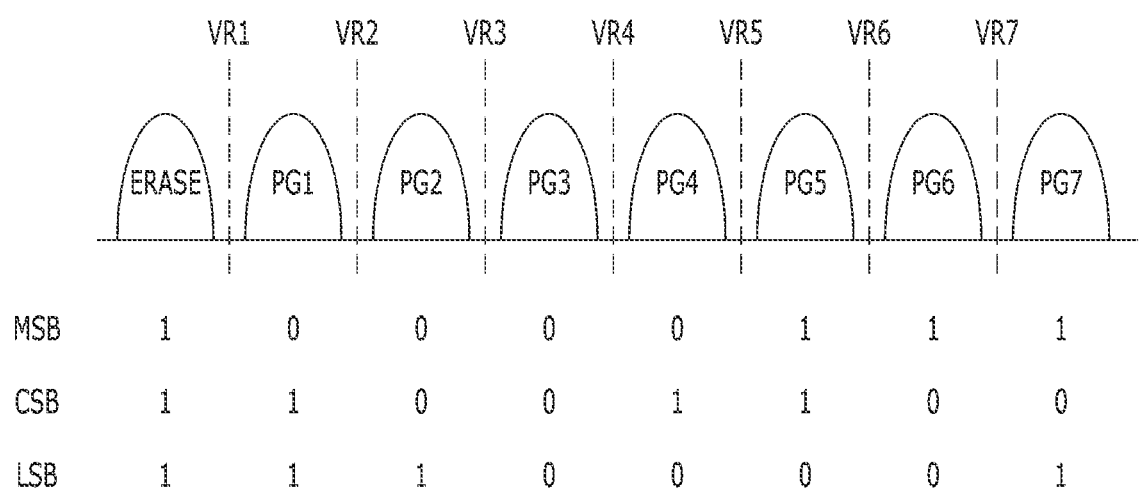
FIG. 1 is a diagram illustrating a threshold voltage distribution of a memory cell that stores 3 bits of data.

FIG. 1 is a diagram illustrating a threshold voltage distribution of a memory cell that stores 3 bits of data.

When 3 bits of data are stored in one memory cell, a threshold voltage Vth of the memory cell may have one of eight (=2^3) states. The eight states may include one erase state ERASE and seven program states PG1 to PG7.

When the memory cell is in the erase state ERASE in which the threshold voltage Vth of the memory cell is lower than a first read voltage VR1, the data of which the 3 bits are (1, 1, 1) may be stored in the memory cell in the order of a most significant bit (MSB), a central significant bit (CSB) and a least significant bit (LSB).

When the memory cell is in the first program state PG1 in which the threshold voltage Vth of the memory cell is higher than the first read voltage VR1 and lower than a second read voltage VR2, the data of which the 3 bits are (0, 0, 1) may be stored in the memory cell, and when the memory cell is in the second program state PG2 in which the threshold voltage Vth of the memory cell is higher than the second read voltage VR2 and lower than a third read voltage VR3, the data of which the 3 bits are (0, 0, 1) may be stored in the memory cell.

Similarly, when the memory cell is in the third program state PG3, the data of which the 3 bits are (0, 0, 0) may be stored in the memory cell, when the memory cell is in the fourth program state PG4, the data of which the 3 bits are (0, 1, 0) may be stored in the memory cell, when the memory cell is in the fifth program state PG5, the data of which the 3 bits are (1, 1, 0) may be stored in the memory cell, when the memory cell is in the sixth program state PG6, the data of which the 3 bits are (1, 0, 0) may be stored in the memory cell, and when the memory cell is in the seventh program state PG7, the data of which the 3 bits are (1, 0, 1) may be stored in the memory cell.

Figure 2:
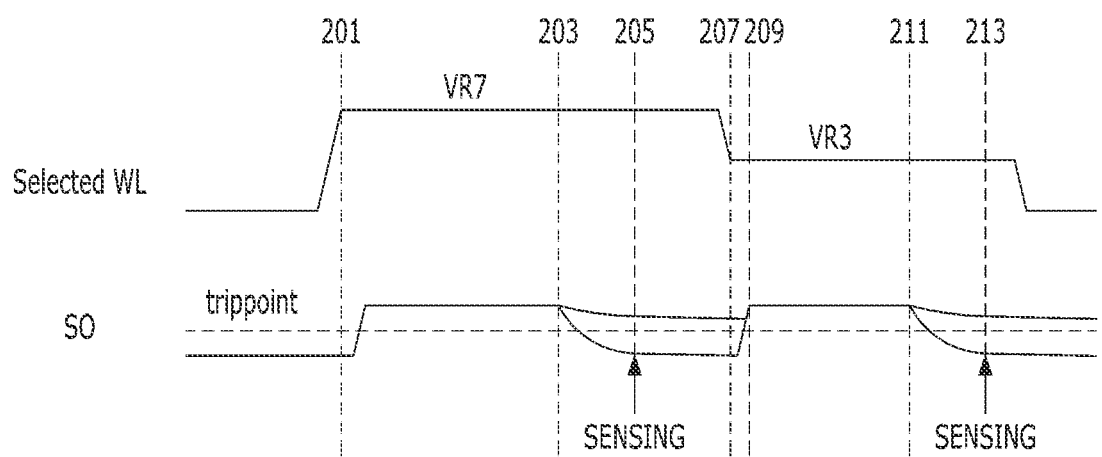
FIG. 2 is a diagram illustrating a process of reading LSB data among 3 bits of data stored in a memory cell.
Figure 3:
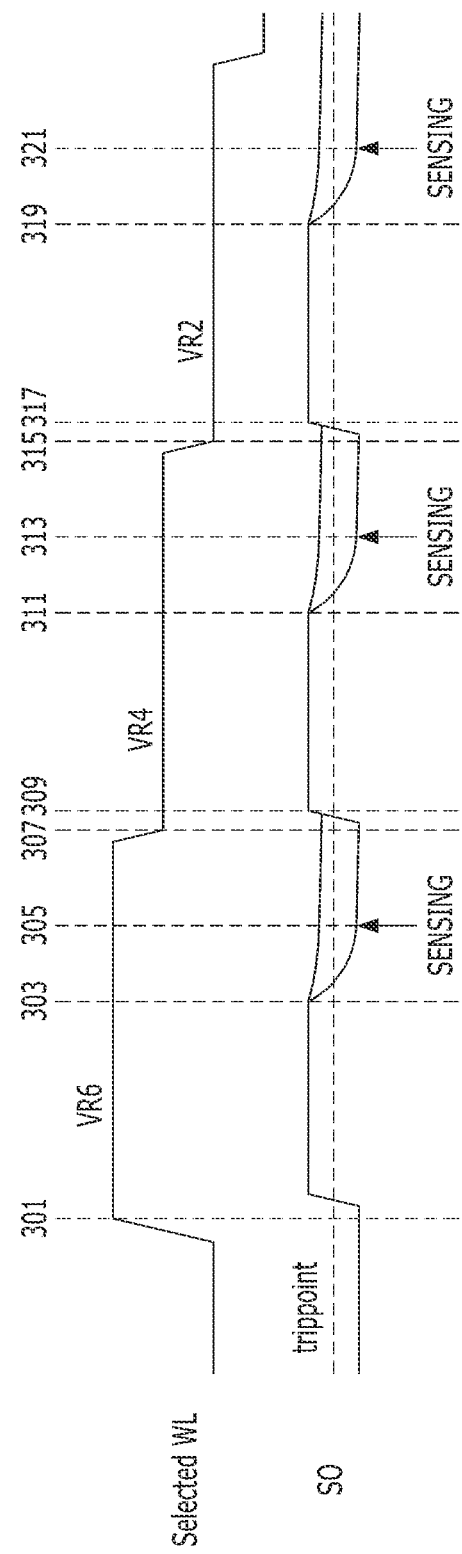
FIG. 3 is a diagram illustrating a process of reading CSB data among 3 bits of data stored in a memory cell.
Figure 4:
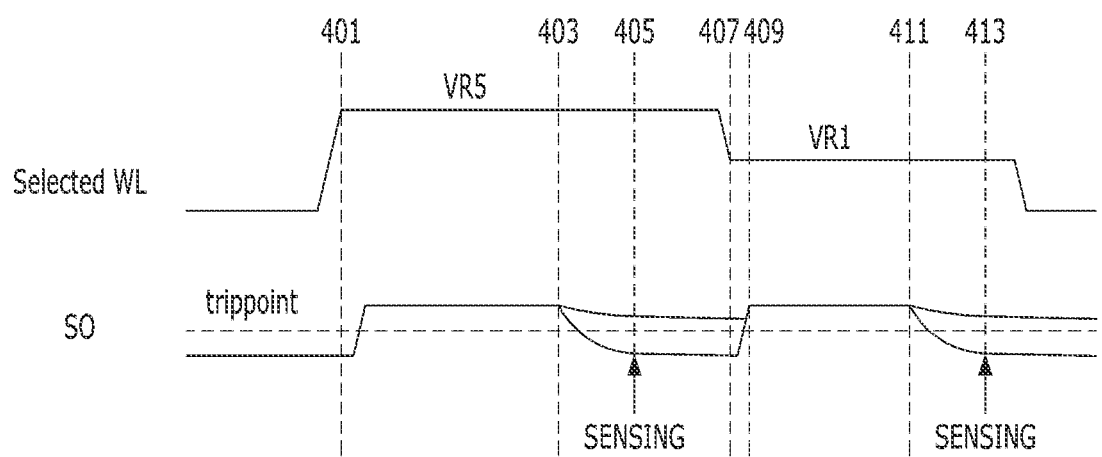
FIG. 4 is a diagram illustrating a process of reading MSB data among 3 bits of data stored in a memory cell.

FIGS. 2 to 4 are diagrams each illustrating a process of reading data of a memory cell having the same distribution as illustrated in FIG. 1.

FIG. 2 is a diagram illustrating a process of reading LSB data among 3 bits of data stored in the memory cell. Referring to FIG. 1, the LSB data of the states ERASE, PG1, and PG2 is 1, the LSB data of the states PG3, PG4, PG5, and PG6 is 0, and the LSB data of the state PG7 is 1. Therefore, in order to read the LSB data, it is necessary to check the threshold voltage of the memory cell based on a seventh read voltage VR7 and a third read voltage VR3.

Referring to FIG. 2, at a point in time 201, the seventh read voltage VR7 may be applied to a selected word line Selected WL, which is a word line connected to a gate of a selected memory cell, so as to read the data. From a point in time 203, a sensing node SO may be evaluated. When the memory cell is turned on by the application of the seventh read voltage VR7, that is, when the threshold voltage of the memory cell is lower than the seventh read voltage VR7, a voltage level of the sensing node SO may become lower than a trip point. When the memory cell is not turned on by the application of the seventh read voltage VR7, that is, when the threshold voltage of the memory cell is higher than the seventh read voltage VR7, the voltage level of the sensing node SO may stay higher than the trip point. In addition, the voltage level of the sensing node SO may be sensed at a point in time 205. Accordingly, the threshold voltage of the selected memory cell may be sorted into the state PG7 and the states ERASE and PG1 to PG6.

At a point in time 207, the third read voltage VR3 may be applied to the selected word line Selected WL. At a point in time 209, the sensing node SO may be pre-charged, and from a point in time 211, the sensing node SO may be evaluated. When the threshold voltage of the memory cell is lower than the third read voltage VR3, the voltage level of the sensing node SO may become lower than the trip point, and when the threshold voltage of the memory cell is higher than the third read voltage VR3, the voltage level of the sensing node SO may stay higher than the trip point. In addition, the voltage level of the sensing node SO may be sensed at a point in time 213. Accordingly, the threshold voltage of the selected memory cell may be sorted into the states ERASE, PG1, and PG2 and the states PG3 to PG7.

Using a result obtained by sensing the voltage level of the sensing node SO at the point in time 205 and a result obtained by sensing the voltage level of the sensing node SO at the point in time 213, it is possible to determine whether the LSB data stored in the memory cell is 1 or 0.

FIG. 3 is a diagram illustrating a process of reading CSB data among 3 bits of data stored in the memory cell. Referring to FIG. 1, the CSB data of the states ERASE and PG1 is 1, the CSB data of the states PG2 and PG3 is 0, the CSB data of the states PG4 and PG5 is 1, and the CSB data of the states PG6 and PG7 is 0. Therefore, in order to read the CSB data, it is necessary to check the threshold voltage of the memory cell based on a sixth read voltage VR6, a fourth read voltage VR4, and a second read voltage VR2.

Referring to FIG. 3, at a point in time 301, the sixth read voltage VR6 may be applied to a selected word line Selected WL. From a point in time 303, a sensing node SO may be evaluated. When the threshold voltage of the memory cell is lower than the sixth read voltage VR6, a voltage level of the sensing node SO may become lower than a trip point. When the threshold voltage of the memory cell is higher than the sixth read voltage VR6, the voltage level of the sensing node SO may stay higher than the trip point. In addition, the voltage level of the sensing node SO may be sensed at a point in time 305. Accordingly, the threshold voltage of the selected memory cell may be sorted into the states PG6 and PG7 and the states ERASE and PG1 to PG5.

At a point in time 307, the fourth read voltage VR4 may be applied to the selected word line Selected WL. At a point in time 309, the sensing node SO may be pre-charged, and from a point in time 311, the sensing node SO may be evaluated. When the threshold voltage of the memory cell is lower than the fourth read voltage VR4, the voltage level of the sensing node SO may become lower than the trip point, and when the threshold voltage of the memory cell is higher than the fourth read voltage VR4, the voltage level of the sensing node SO may stay higher than the trip point. In addition, the voltage level of the sensing node SO may be sensed at a point in time 313. Accordingly, the threshold voltage of the selected memory cell may be sorted into the states ERASE, PG1 to PG3 and the states PG4 to PG7.

At a point in time 315, the second read voltage VR2 may be applied to the selected word line Selected WL. At a point in time 317, the sensing node SO may be pre-charged, and from a point in time 319, the sensing node SO may be evaluated. When the threshold voltage of the memory cell is lower than the second read voltage VR2, the voltage level of the sensing node SO may become lower than the trip point, and when the threshold voltage of the memory cell is higher than the second read voltage VR2, the voltage level of the sensing node SO may stay higher than the trip point. In addition, the voltage level of the sensing node SO may be sensed at a point in time 321. Accordingly, the threshold voltage of the selected memory cell may be sorted into the states ERASE and PG1 and the states PG2 to PG7.

Using results obtained by sensing the voltage level of the sensing node SO at the points in time 305, 313, and 321, it is possible to determine whether the CSB data stored in the memory cell is 1 or 0.

FIG. 4 is a diagram illustrating a process of reading MSB data among 3 bits of data stored in the memory cell.

Referring to FIG. 1, the MSB data of the state ERASE is 1, the MSB data of the states PG1 to PG4 is 0, and the MSB data of the states PG5 to PG7 is 1. Therefore, in order to read the MSB data, it is necessary to check the threshold voltage of the memory cell based on a fifth read voltage VR5 and a first read voltage VR1.

Referring to FIG. 4, at a point in time 401, the fifth read voltage VR5 may be applied to a selected word line Selected WL. From a point in time 403, a sensing node SO may be evaluated. When the threshold voltage of the memory cell is lower than the fifth read voltage VR5, a voltage level of the sensing node SO may become lower than a trip point. When the threshold voltage of the memory cell is higher than the fifth read voltage VR5, the voltage level of the sensing node SO may stay higher than the trip point. In addition, the voltage level of the sensing node SO may be sensed at a point in time 405. Accordingly, the threshold voltage of the selected memory cell may be sorted into the states PG5 to PG7 and the states ERASE and PG1 to PG4.

At a point in time 407, the first read voltage VR1 may be applied to the selected word line Selected WL. At a point in time 409, the sensing node SO may be pre-charged, and from a point in time 411, the sensing node SO may be evaluated. When the threshold voltage of the memory cell is lower than the first read voltage VR1, the voltage level of the sensing node SO may become lower than the trip point, and when the threshold voltage of the memory cell is higher than the first read voltage VR1, the voltage level of the sensing node SO may stay higher than the trip point. In addition, the voltage level of the sensing node SO may be sensed at a point in time 413. Accordingly, the threshold voltage of the selected memory cell may be sorted into the state ERASE and the states PG1 to PG7.

Using a result obtained by sensing the voltage level of the sensing node SO at the point in time 405 and a result obtained by sensing the voltage level of the sensing node SO at the point in time 413, it is possible to determine whether the MSB data stored in the memory cell is 1 or 0.

Referring to FIGS. 2 to 4, in order to read the LSB data of the memory cell, two read voltages VR7 and VR3 have to be applied to the memory cell, the sensing node SO has to be evaluated twice, and the sensing operation has to be performed twice. In order to read the CSB data of the memory cell, three read voltages VR6, VR4, and VR2 have to be applied to the memory cell, the sensing node SO has to be evaluated three times, and the sensing operation has to be performed three times. In addition, in order to read the MSB of the memory cell, two read voltages VR5 and VR1 have to be applied to the memory cell, the sensing node SO has to be evaluated twice, and the sensing operation has to be performed twice. That is, in order to read all 3 bits of data stored in the memory cell, the seven read voltages VR1 to VR7 have to be applied, the sensing node SO has to be evaluated seven times, and the sensing operation has to be performed seven times, and therefore, a great deal of time is required to perform the read operation.

Figure 5:
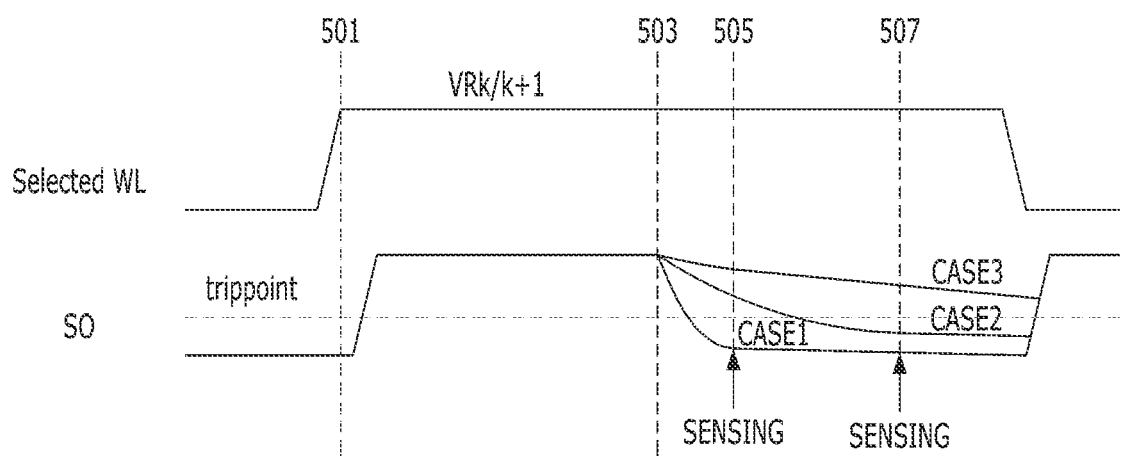
FIG. 5 is a diagram illustrating a process of reading data of a memory cell in accordance with an embodiment of the present disclosure.

FIG. 5 is a diagram illustrating a process of reading data of a memory cell in accordance with an embodiment of the present disclosure. In FIG. 5, a method of reading the data by applying one read voltage to the memory cell and performing a sensing operation twice at different points in time during one evaluation period is described, where the method has the same effect as a method of reading the data by applying two read voltages to the memory cell and performing an evaluation operation and the sensing operation twice.

Referring to FIG. 5, at a point in time 501, a read voltage VRk/k+1 (where "k" is a positive integer) may be applied to a selected word line Selected WL, which is a word line connected to a gate of a selected memory cell, so as to read the data from the selected memory cell. The read voltage VRk/k+1 may have a level between a $k^{th}$ read voltage VRk and a $(k+1)^{th}$ read voltage VRk+1. For example, when a read operation using a fifth read voltage VR5 and a read operation using a sixth read voltage VR6 are performed using one read voltage, a read voltage VR5/6 may be used, and the read voltage VR5/6 may have a voltage level between the fifth read voltage VR5 and the sixth read voltage VR6.

From a point in time 503, a sensing node SO may be evaluated. When a threshold voltage of the memory cell is lower than the $k^{th}$ read voltage VRk, the memory cell is very strongly turned on, and thus the sensing node SO may be evaluated as shown in case 1 CASE1. When the threshold voltage of the memory cell is higher than the $k^{th}$ read voltage VRk and lower than the $(k+1)^{th}$ read voltage VRk+1, the memory cell is weakly turned on, and thus the sensing node SO may be evaluated as shown in case 2 CASE2. When the threshold voltage of the memory cell is higher than the $(k+1)^{th}$ read voltage VRk+1, the memory cell is strongly turned on, and thus the sensing node SO may be evaluated as shown in case 3 CASE3.

At a point in time 505, a voltage level of the sensing node SO may be sensed. At the point in time 505, the voltage level of the sensing node SO is lower than a trip point in case 1 CASE1, and the voltage level of the sensing node SO is higher than the trip point in case 2 CASE2 and case 3 CASE3, and thus it is possible to distinguish case 1 CASE1 and cases 2 and 3 CASE 2 and CASE3 by sensing the voltage level of the sensing node SO at the point in time 505. That is, a result obtained by sensing the voltage level of the sensing node at the point in time 505 may be the same as a result obtained by sensing the memory cell using the $k^{th}$ read voltage VRk.

At a point in time 507 after time lapses from the point in time 505, the voltage level of the sensing node SO may be sensed. At the point in time 507, the voltage level of the sensing node SO is lower than the trip point in case 1 CASE1 and case 2 CASE2, and the voltage level of the sensing node SO is higher than the trip point in case 3 CASE3, and thus it is possible to distinguish cases 1 and 2 CASE1 and CASE 2 and case 3 CASE3 by sensing the voltage level of the sensing node SO at the point in time 507. That is, a result obtained by sensing the voltage level of the sensing node at the point in time 507 may be the same as a result obtained by sensing the memory cell using the $(k+1)^{th}$ read voltage VRk+1.

Referring to FIG. 5, it may be seen that the read operation performed by using one read voltage VRk/k+1 and sensing the voltage level of the sensing node SO twice at different points in time 505 and 507 during one evaluation period may obtain the same result as the read operation performed by using two read voltages VRk and VRk+1 and performing the evaluation operation and sensing operation twice. For example, a result obtained by applying the read voltages VR5/6 and sensing the sensing node SO twice at different points in time during the evaluation period may be the same as a result obtained by applying the fifth read voltage VR5, sensing the sensing node SO after evaluation, applying the sixth read voltage VR6, and sensing the sensing node SO after evaluation.

Figure 6:
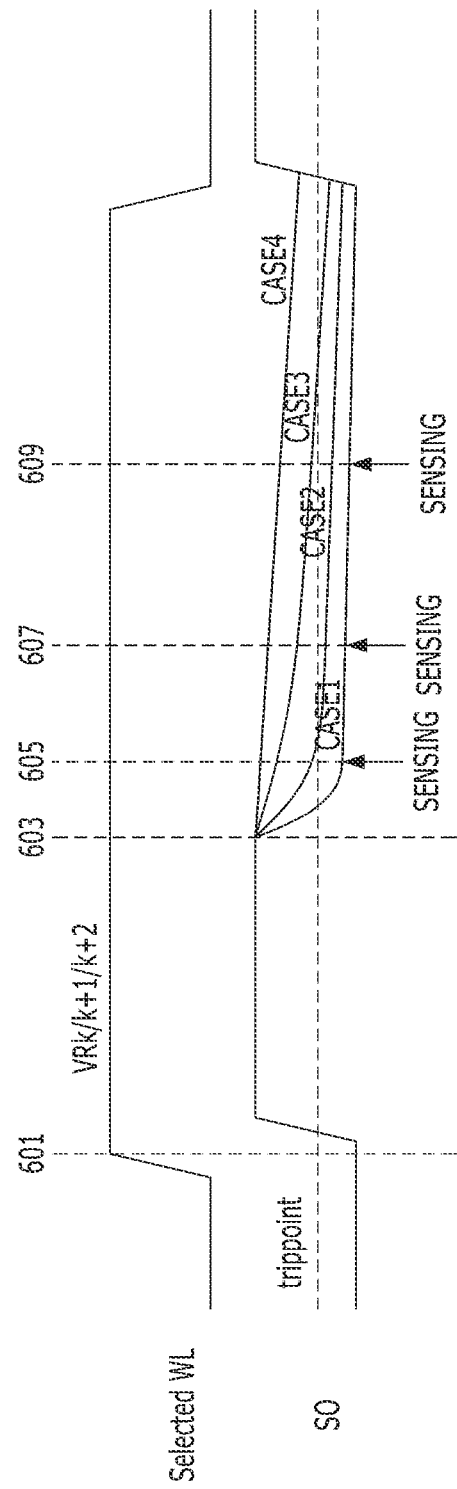
FIG. 6 is a diagram illustrating a process of reading data of a memory cell in accordance with another embodiment of the present disclosure.

FIG. 6 is a diagram illustrating a process of reading data of a memory cell in accordance with another embodiment of the present disclosure. In FIG. 6, a method of reading the data by applying one read voltage to the memory cell and performing a sensing operation three times at different points in time during one evaluation period is described, where the method has the same effect as a method of reading the data by applying three read voltages to the memory cell and performing an evaluation operation and the sensing operation three times.

Referring to FIG. 6, at a point in time 601, a read voltage VRk/k+1/k+2 may be applied to a selected word line Selected WL. The read voltage VRk/k+1/k+2 may have a level between a $k^{th}$ read voltage VRk and a $(k+2)^{th}$ read voltage VRk+2. For example, when a read operation using a third read voltage VR3, a read operation using a fourth read voltage VR4, and a read operation using a fifth read voltage VR5 are performed using one read voltage, a read voltages VR3/4/5 may be used, and the read voltage VR3/4/5 may have a voltage level between the third read voltage VR3 and the fifth read voltage VR5.

From a point in time 603, a sensing node SO may be evaluated. When a threshold voltage of the memory cell is lower than the $k^{th}$ read voltage VRk, the sensing node SO may be evaluated as shown in case 1 CASE1. When the threshold voltage of the memory cell is higher than the $k^{th}$ read voltage VRk and lower than the $(k+1)^{th}$ read voltage VRk+1, the sensing node SO may be evaluated as shown in case 2 CASE2. When the threshold voltage of the memory cell is higher than the $(k+1)^{th}$ read voltage VRk+1 and lower than the $(k+2)^{th}$ read voltage VRk+2, the sensing node SO may be evaluated as shown in case 3 CASE3. In addition, when the threshold voltage of the memory cell is higher than the $(k+2)^{th}$ read voltage VRk+2, the sensing node SO may be evaluated as shown in case 4 CASE4.

At a point in time 605, a voltage level of the sensing node SO may be sensed. At the point in time 605, the voltage level of the sensing node SO is lower than a trip point in case 1 CASE1, and the voltage level of the sensing node SO is higher than the trip point in case 2 CASE2, case 3 CASE3, and case 4 CASE4, and thus it is possible to distinguish case 1 CASE1 and cases 2, 3, and 4 CASE 2, CASE3, and CASE4 by sensing the voltage level of the sensing node SO at the point in time 605. That is, a result obtained by sensing the voltage level of the sensing node at the point in time 605 may be the same as a result obtained by sensing the memory cell using the $k^{th}$ read voltage VRk.

At a point in time 607 after time lapses from the point in time 605, the voltage level of the sensing node SO may be sensed. At the point in time 607, the voltage level of the sensing node SO is lower than the trip point in case 1 CASE1 and case 2 CASE2, and the voltage level of the sensing node SO is higher than the trip point in case 3 CASE3 and case 4 CASE4, and thus it is possible to distinguish cases 1 and 2 CASE1 and CASE 2 and cases 3 and 4 CASE3 and CASE4 by sensing the voltage level of the sensing node SO at the point in time 607. That is, a result obtained by sensing the voltage level of the sensing node at the point in time 607 may be the same as a result obtained by sensing the memory cell using the $(k+1)^{th}$ read voltage VRk+1.

At a point in time 609 after time lapses from the point in time 607, the voltage level of the sensing node SO may be sensed. At the point in time 609, the voltage level of the sensing node SO is lower than the trip point in case 1 CASE1, case 2 CASE2, and case 3 CASE3, and the voltage level of the sensing node SO is higher than the trip point in case 4 CASE4, and thus it is possible to distinguish cases 1, 2, and 3 CASE1, CASE 2, and CASE3 and case 4 CASE4 by sensing the voltage level of the sensing node SO at the point in time 609. That is, a result obtained by sensing the voltage level of the sensing node at the point in time 609 may be the same as a result obtained by sensing the memory cell using the $(k+2)^{th}$ read voltage VRk+2.

Referring to FIG. 6, it may be seen that the read operation performed by using one read voltage VRk/k+1/k+2 and sensing the voltage level of the sensing node SO three times at different points in time 605, 607, and 609 during one evaluation period may obtain the same result as the read operation performed by using three read voltages VRk, VRk+1, and VRk+2 and performing the evaluation operation and sensing operation three times. For example, a result obtained by applying the read voltages VR3/4/5 and sensing the sensing node SO three times at different points in time during the evaluation period may be the same as a result obtained by applying the third read voltage VR3, sensing the sensing node SO after evaluation, applying the fourth read voltage VR4, sensing the sensing node SO after evaluation, applying the fifth read voltage VR5, and sensing the sensing node SO after evaluation.

FIG. 5 illustrates the sensing of the sensing node SO at two points in time during one evaluation period, and FIG. 6 illustrates the sensing of the sensing node SO at three points in time during one evaluation period. However, it is also possible to sense the sensing node SO at more points in time during one evaluation period.

The methods of reading the data illustrated in FIGS. 5 and 6 and the following methods of reading the data may be performed not only during a read operation performed by a read command but also during a verification operation performed during a program operation performed by a program command, that is, during a read operation performed during a program operation.

FIGS. 7 to 10 illustrate various methods of reading 3 bits of data stored in a memory cell, by using the methods of reading the data illustrated in FIGS. 5 and 6.

Figure 7:
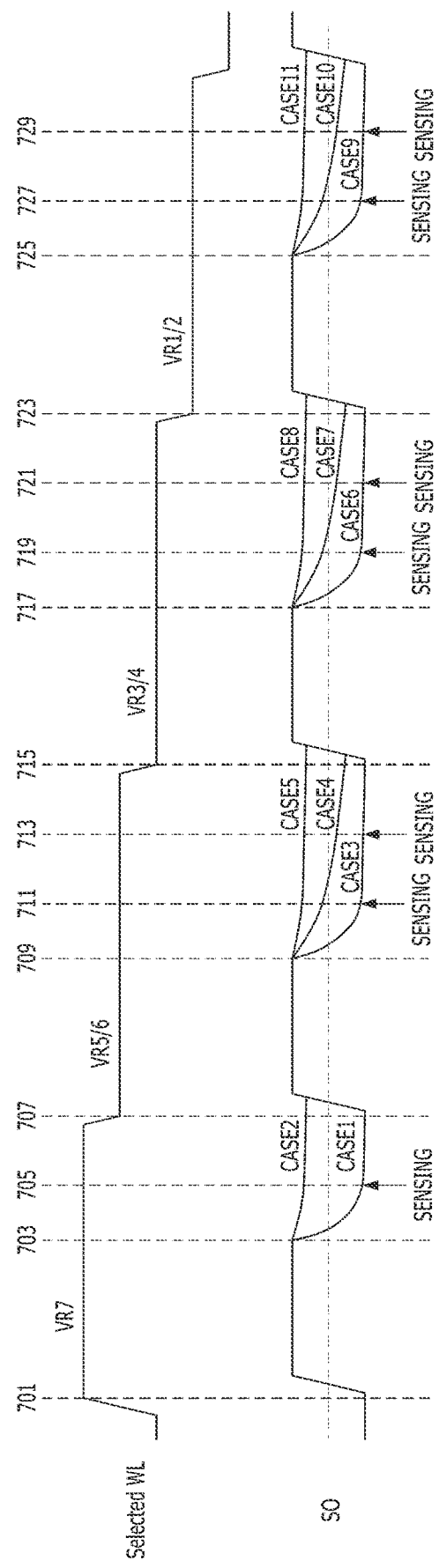
FIG. 7 is a diagram illustrating an example of reading 3 bits of data stored in a memory cell through four read voltages, four evaluations, and seven sensing operations in accordance with an embodiment of the present disclosure.

FIG. 7 is a diagram illustrating an example of reading the 3 bits of data stored in the memory cell through four read voltages, four evaluations, and seven sensing operations in accordance with an embodiment of the present disclosure.

Referring to FIG. 7, at a point in time 701, a seventh read voltage VR7 may be applied to a selected word line Selected WL. From a point in time 703, a sensing node SO may be evaluated. When a threshold voltage of the memory cell is lower than the seventh read voltage VR7, a voltage level of the sensing node SO may be the same as shown in case 1 CASE1, and when the threshold voltage of the memory cell is higher than the seventh read voltage VR7, the voltage level of the sensing node SO may be the same as shown in case 2 CASE2. At a point in time 705, the voltage level of the sensing node SO may be sensed, and consequently, it is possible to determine whether the threshold voltage of the memory cell is higher or lower than the seventh read voltage VR7.

At a point in time 707, a read voltage VR5/6 may be applied to the selected word line Selected WL, and the sensing node SO may be pre-charged. From a point in time 709, the sensing node SO may be evaluated. When the threshold voltage of the memory cell is lower than the fifth read voltage VR5, the voltage level of the sensing node SO may be the same as shown in case 3 CASE3, when the threshold voltage of the memory cell is higher than the fifth read voltage VR5 and lower than the sixth read voltage VR6, the voltage level of the sensing node SO may be the same as shown in case 4 CASE4, and when the threshold voltage of the memory cell is higher than the sixth read voltage VR6, the voltage level of the sensing node SO may be the same as shown in case 5 CASE5. At a point in time 711, the voltage level of the sensing node SO may be sensed, and consequently, it is possible to determine whether the threshold voltage of the memory cell is higher or lower than the fifth read voltage VR5. In addition, at a point in time 713, the voltage level of the sensing node SO may be sensed, and consequently, it is possible to determine whether the threshold voltage of the memory cell is higher or lower than the sixth read voltage VR6.

At a point in time 715, a read voltage VR3/4 may be applied to the selected word line Selected WL, and the sensing node SO may be pre-charged. From a point in time 717, the sensing node SO may be evaluated. When the threshold voltage of the memory cell is lower than the third read voltage VR3, the voltage level of the sensing node SO may be the same as shown in case 6 CASE6, when the threshold voltage of the memory cell is higher than the third read voltage VR3 and lower than the fourth read voltage VR4, the voltage level of the sensing node SO may be the same as shown in case 7 CASE7, and when the threshold voltage of the memory cell is higher than the fourth read voltage VR4, the voltage level of the sensing node SO may be the same as shown in case 8 CASE8. At a point in time 719, the voltage level of the sensing node SO may be sensed, and consequently, it is possible to determine whether the threshold voltage of the memory cell is higher or lower than the third read voltage VR3. In addition, at a point in time 721, the voltage level of the sensing node SO may be sensed, and consequently, it is possible to determine whether the threshold voltage of the memory cell is higher or lower than the fourth read voltage VR4.

At a point in time 723, a read voltage VR1/2 may be applied to the selected word line Selected WL, and the sensing node SO may be pre-charged. From a point in time 725, the sensing node SO may be evaluated. When the threshold voltage of the memory cell is lower than the first read voltage VR1, the voltage level of the sensing node SO may be the same as shown in case 9 CASE9, when the threshold voltage of the memory cell is higher than the first read voltage VR1 and lower than the second read voltage VR2, the voltage level of the sensing node SO may be the same as shown in case 10 CASE10, and when the threshold voltage of the memory cell is higher than the second read voltage VR2, the voltage level of the sensing node SO may be the same as shown in case 11 CASE11. At a point in time 727, the voltage level of the sensing node SO may be sensed, and consequently, it is possible to determine whether the threshold voltage of the memory cell is higher or lower than the first read voltage VR1. In addition, at a point in time 729, the voltage level of the sensing node SO may be sensed, and consequently, it is possible to determine whether the threshold voltage of the memory cell is higher or lower than the second read voltage VR2.

Through the operations of FIG. 7, it is possible to know which state the threshold voltage of the memory cell is in among the 8 states ERASE and PG1 to PG7, which may mean that it is possible to know levels of the 3 bits of data LSB, CSB, and MSB stored in the memory cell.

Figure 8:
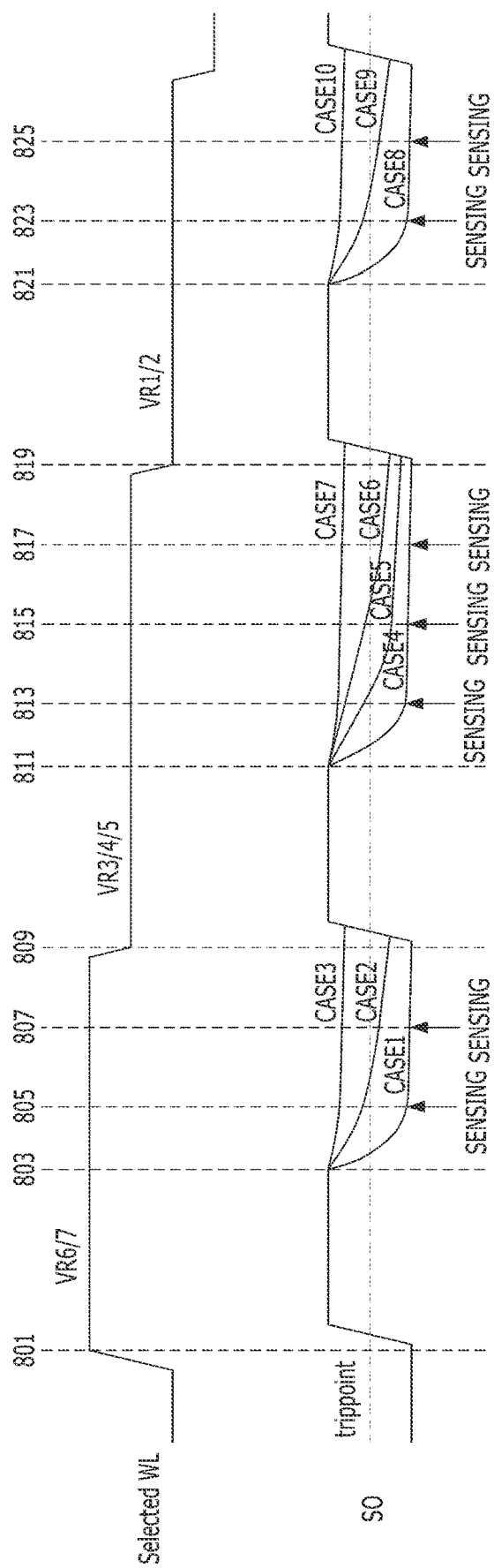
FIG. 8 is a diagram illustrating an example of reading 3 bits of data stored in a memory cell through three read voltages, three evaluations, and seven sensing operations in accordance with an embodiment of the present disclosure.

FIG. 8 is a diagram illustrating an example of reading the 3 bits of data stored in the memory cell through three read voltages, three evaluations, and seven sensing operations in accordance with an embodiment of the present disclosure.

Referring to FIG. 8, at a point in time 801, a read voltage VR6/7 may be applied to a selected word line Selected WL. From a point in time 803, a sensing node SO may be evaluated. When a threshold voltage of the memory cell is lower than the sixth read voltage VR6, a voltage level of the sensing node SO may be the same as shown in case 1 CASE1, when the threshold voltage of the memory cell is higher than the sixth read voltage VR6 and lower than the seventh read voltage VR7, the voltage level of the sensing node SO may be the same as shown in case 2 CASE2, and when the threshold voltage of the memory cell is higher than the seventh read voltage VR7, the voltage level of the sensing node SO may be the same as shown in case 3 CASE3. At a point in time 805, the voltage level of the sensing node SO may be sensed, and consequently, it is possible to determine whether the threshold voltage of the memory cell is higher or lower than the sixth read voltage VR6. In addition, at a point in time 807, the voltage level of the sensing node SO may be sensed, and consequently, it is possible to determine whether the threshold voltage of the memory cell is higher or lower than the seventh read voltage VR7.

At a point in time 809, a read voltage VR3/4/5 may be applied to the selected word line Selected WL, and the sensing node SO may be pre-charged. From a point in time 811, the sensing node SO may be evaluated. When the threshold voltage of the memory cell is lower than the third read voltage VR3, the voltage level of the sensing node SO may be the same as shown in case 4 CASE4, when the threshold voltage of the memory cell is higher than the third read voltage VR3 and lower than the fourth read voltage VR4, the voltage level of the sensing node SO may be the same as shown in case 5 CASE5, when the threshold voltage of the memory cell is higher than the fourth read voltage VR4 and lower than the fifth read voltage VR5, the voltage level of the sensing node SO may be the same as shown in case 6 CASE6, and when the threshold voltage of the memory cell is higher than the fifth read voltage VR5, the voltage level of the sensing node SO may be the same as shown in case 7 CASE7. At a point in time 813, the voltage level of the sensing node SO may be sensed, and consequently, it is possible to determine whether the threshold voltage of the memory cell is higher or lower than the third read voltage VR3. At a point in time 815, the voltage level of the sensing node SO may be sensed, and consequently, it is possible to determine whether the threshold voltage of the memory cell is higher or lower than the fourth read voltage VR4. In addition, at a point in time 817, the voltage level of the sensing node SO may be sensed, and consequently, it is possible to determine whether the threshold voltage of the memory cell is higher or lower than the fifth read voltage VR5.

At a point in time 819, a read voltage VR1/2 may be applied to the selected word line Selected WL, and the sensing node SO may be pre-charged. From a point in time 821, the sensing node SO may be evaluated. When the threshold voltage of the memory cell is lower than the first read voltage VR1, the voltage level of the sensing node SO may be the same as shown in case 8 CASE8, when the threshold voltage of the memory cell is higher than the first read voltage VR1 and lower than the second read voltage VR2, the voltage level of the sensing node SO may be the same as shown in case 9 CASE9, and when the threshold voltage of the memory cell is higher than the second read voltage VR2, the voltage level of the sensing node SO may be the same as shown in case 10 CASE10. At a point in time 823, the voltage level of the sensing node SO may be sensed, and consequently, it is possible to determine whether the threshold voltage of the memory cell is higher or lower than the first read voltage VR1. In addition, at a point in time 825, the voltage level of the sensing node SO may be sensed, and consequently, it is possible to determine whether the threshold voltage of the memory cell is higher or lower than the second read voltage VR2.

Through the operations of FIG. 8, it is possible to know which state the threshold voltage of the memory cell is in among the 8 states ERASE and PG1 to PG7, which may mean that it is possible to know levels of the 3 bits of data LSB, CSB, and MSB stored in the memory cell.

Figure 9:
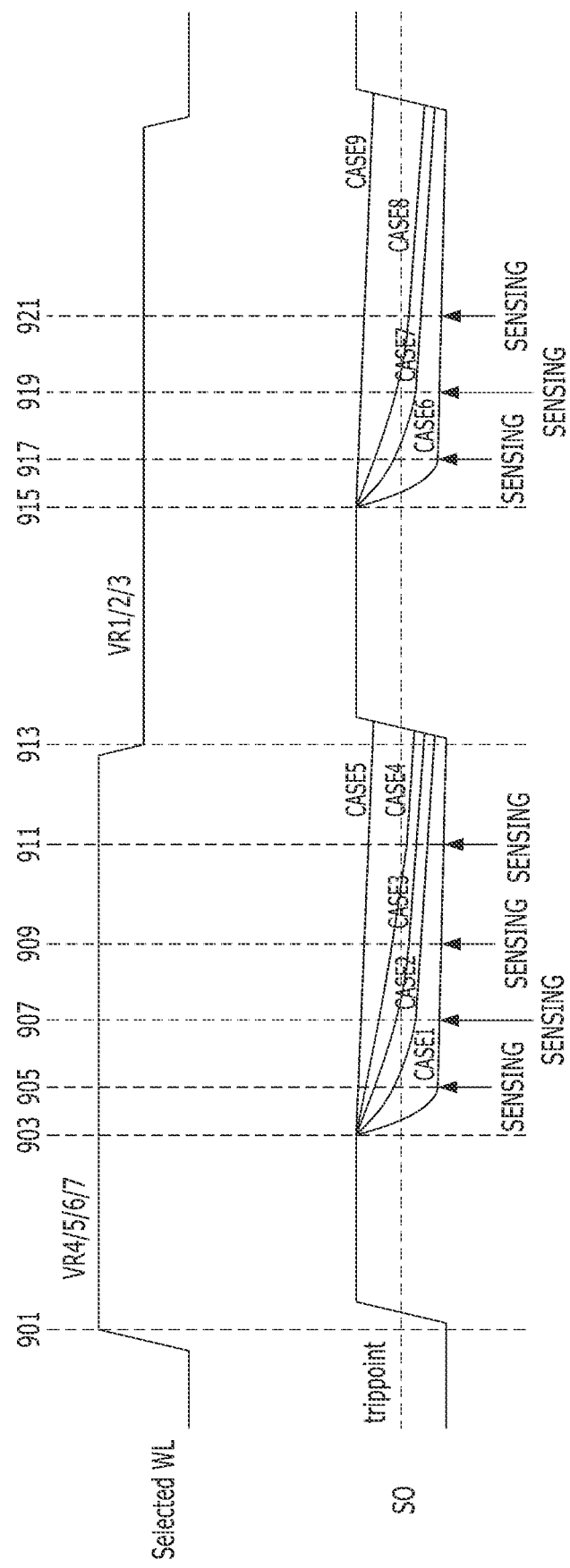
FIG. 9 is a diagram illustrating an example of reading 3 bits of data stored in a memory cell through two read voltages, two evaluations, and seven sensing operations in accordance with an embodiment of the present disclosure.

FIG. 9 is a diagram illustrating an example of reading the 3 bits of data stored in the memory cell through two read voltages, two evaluations, and seven sensing operations in accordance with an embodiment of the present disclosure.

Referring to FIG. 9, at a point in time 901, a read voltage VR4/5/6/7 may be applied to a selected word line Selected WL. From a point in time 903, a sensing node SO may be evaluated. When a threshold voltage of the memory cell is lower than the fourth read voltage VR4, a voltage level of the sensing node SO may be the same as shown in case 1 CASE1, when the threshold voltage of the memory cell is higher than the fourth read voltage VR4 and lower than the fifth read voltage VR5, the voltage level of the sensing node SO may be the same as shown in case 2 CASE2, when the threshold voltage of the memory cell is higher than the fifth read voltage VR5 and lower than the sixth read voltage VR6, the voltage level of the sensing node SO may be the same as shown in case 3 CASE3, when the threshold voltage of the memory cell is higher than the sixth read voltage VR6 and lower than the seventh read voltage VR7, the voltage level of the sensing node SO may be the same as shown in case 4 CASE4, and when the threshold voltage of the memory cell is higher than the seventh read voltage VR7, the voltage level of the sensing node SO may be the same as shown in case 5 CASE5. At a point in time 905, the voltage level of the sensing node SO may be sensed, and consequently, it is possible to determine whether the threshold voltage of the memory cell is higher or lower than the fourth read voltage VR4. At a point in time 907, the voltage level of the sensing node SO may be sensed, and consequently, it is possible to determine whether the threshold voltage of the memory cell is higher or lower than the fifth read voltage VR5. At a point in time 909, the voltage level of the sensing node SO may be sensed, and consequently, it is possible to determine whether the threshold voltage of the memory cell is higher or lower than the sixth read voltage VR6. In addition, at a point in time 911, the voltage level of the sensing node SO may be sensed, and consequently, it is possible to determine whether the threshold voltage of the memory cell is higher or lower than the seventh read voltage VR7.

At a point in time 913, a read voltage VR1/2/3 may be applied to the selected word line Selected WL, and the sensing node SO may be pre-charged. From a point in time 915, the sensing node SO may be evaluated. When the threshold voltage of the memory cell is lower than the first read voltage VR1, the voltage level of the sensing node SO may be the same as shown in case 6 CASE6, when the threshold voltage of the memory cell is higher than the first read voltage VR1 and lower than the second read voltage VR2, the voltage level of the sensing node SO may be the same as shown in case 7 CASE7, when the threshold voltage of the memory cell is higher than the second read voltage VR2 and lower than the third read voltage VR3, the voltage level of the sensing node SO may be the same as shown in case 8 CASE8, and when the threshold voltage of the memory cell is higher than the third read voltage VR3, the voltage level of the sensing node SO may be the same as shown in case 9 CASE9. At a point in time 917, the voltage level of the sensing node SO may be sensed, and consequently, it is possible to determine whether the threshold voltage of the memory cell is higher or lower than the first read voltage VR1. At a point in time 919, the voltage level of the sensing node SO may be sensed, and consequently, it is possible to determine whether the threshold voltage of the memory cell is higher or lower than the second read voltage VR2. In addition, at a point in time 921, the voltage level of the sensing node SO may be sensed, and consequently, it is possible to determine whether the threshold voltage of the memory cell is higher or lower than the third read voltage VR3.

Through the operations of FIG. 9, it is possible to know which state the threshold voltage of the memory cell is in among the 8 states ERASE and PG1 to PG7, which may mean that it is possible to know levels of the 3 bits of data LSB, CSB, and MSB stored in the memory cell.

Figure 10:
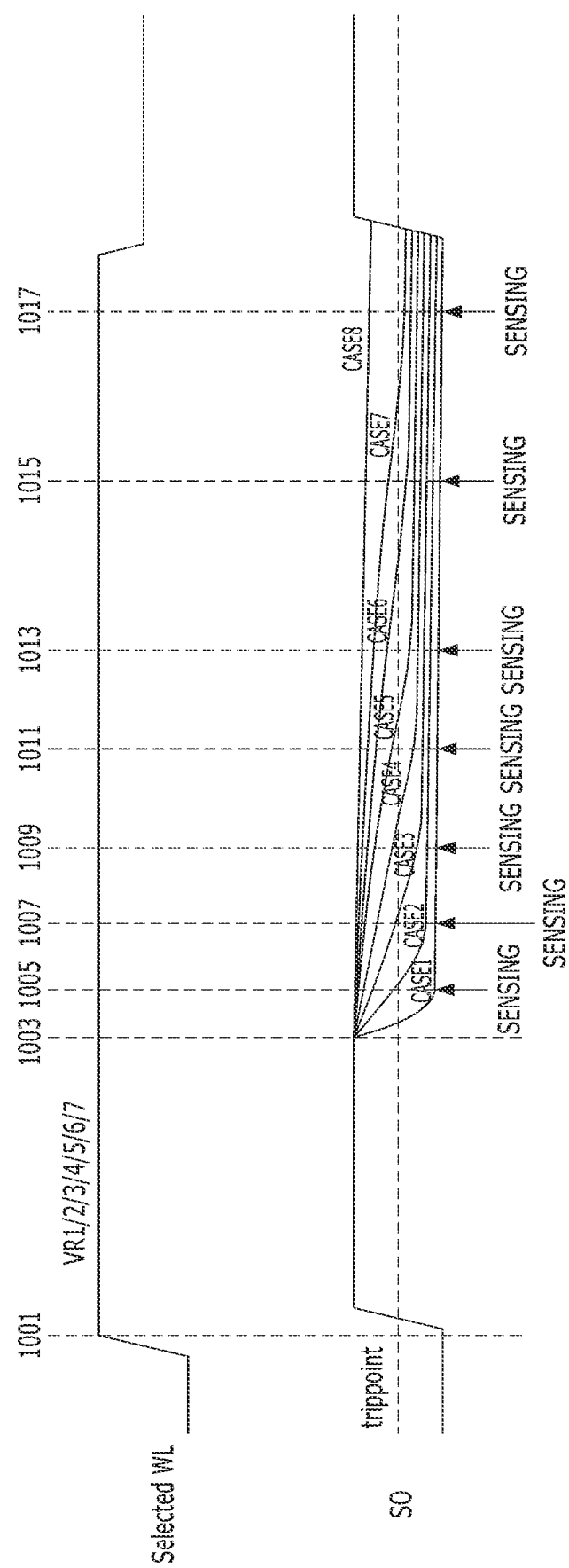
FIG. 10 is a diagram illustrating an example of reading 3 bits of data stored in a memory cell through one read voltage, one evaluation, and seven sensing operations in accordance with an embodiment of the present disclosure.

FIG. 10 is a diagram illustrating an example of reading the 3 bits of data stored in the memory cell through one read voltage, one evaluation, and seven sensing operations in accordance with an embodiment of the present disclosure.

Referring to FIG. 10, at a point in time 1001, a read voltage VR1/2/3/4/5/6/7 may be applied to a selected word line Selected WL. From a point in time 1003, a sensing node SO may be evaluated. When the threshold voltage of the memory cell is lower than the first read voltage VR1, a voltage level of the sensing node SO may be the same as shown in case 1 CASE1, when the threshold voltage of the memory cell is higher than the first read voltage VR1 and lower than the second read voltage VR2, the voltage level of the sensing node SO may be the same as shown in case 2 CASE2, when the threshold voltage of the memory cell is higher than the second read voltage VR2 and lower than the third read voltage VR3, the voltage level of the sensing node SO may be the same as shown in case 3 CASE3, and when the threshold voltage of the memory cell is higher than the third read voltage VR3 and lower than the fourth read voltage VR4, the voltage level of the sensing node SO may be the same as shown in case 4 CASE4. In addition, when the threshold voltage of the memory cell is higher than the fourth read voltage VR4 and lower than the fifth read voltage VR5, the voltage level of the sensing node SO may be the same as shown in case 5 CASE5, when the threshold voltage of the memory cell is higher than the fifth read voltage VR5 and lower than the sixth read voltage VR6, the voltage level of the sensing node SO may be the same as shown in case 6 CASE6, when the threshold voltage of the memory cell is higher than the sixth read voltage VR6 and lower than the seventh read voltage VR7, the voltage level of the sensing node SO may be the same as shown in case 7 CASE7, and when the threshold voltage of the memory cell is higher than the seventh read voltage VR7, the voltage level of the sensing node SO may be the same as shown in case 8 CASE8.

At a point in time 1005, the voltage level of the sensing node SO may be sensed, and consequently, it is possible to determine whether the threshold voltage of the memory cell is higher or lower than the first read voltage VR1. At a point in time 1007, the voltage level of the sensing node SO may be sensed, and consequently, it is possible to determine whether the threshold voltage of the memory cell is higher or lower than the second read voltage VR2. At a point in time 1009, the voltage level of the sensing node SO may be sensed, and consequently, it is possible to determine whether the threshold voltage of the memory cell is higher or lower than the third read voltage VR3. Similarly, at points in time 1011, 1013, 1015, and 1017, the voltage level of the sensing node SO may be sensed, and consequently, it is possible to determine whether the threshold voltage of the memory cell is higher or lower than the fourth to seventh read voltages VR4 to VR7.

As seen in FIGS. 7 to 10, it may be possible to quickly read multi-bit data stored in a memory cell by using various read voltages and performing the sensing operation at various points in time. In the above-described embodiments, it may be seen that one memory cell stores and reads the 3 bits of data, but the above-described methods may be used even when one memory cell stores 2 bits of data or 4 or more bits of data.

Figure 11:
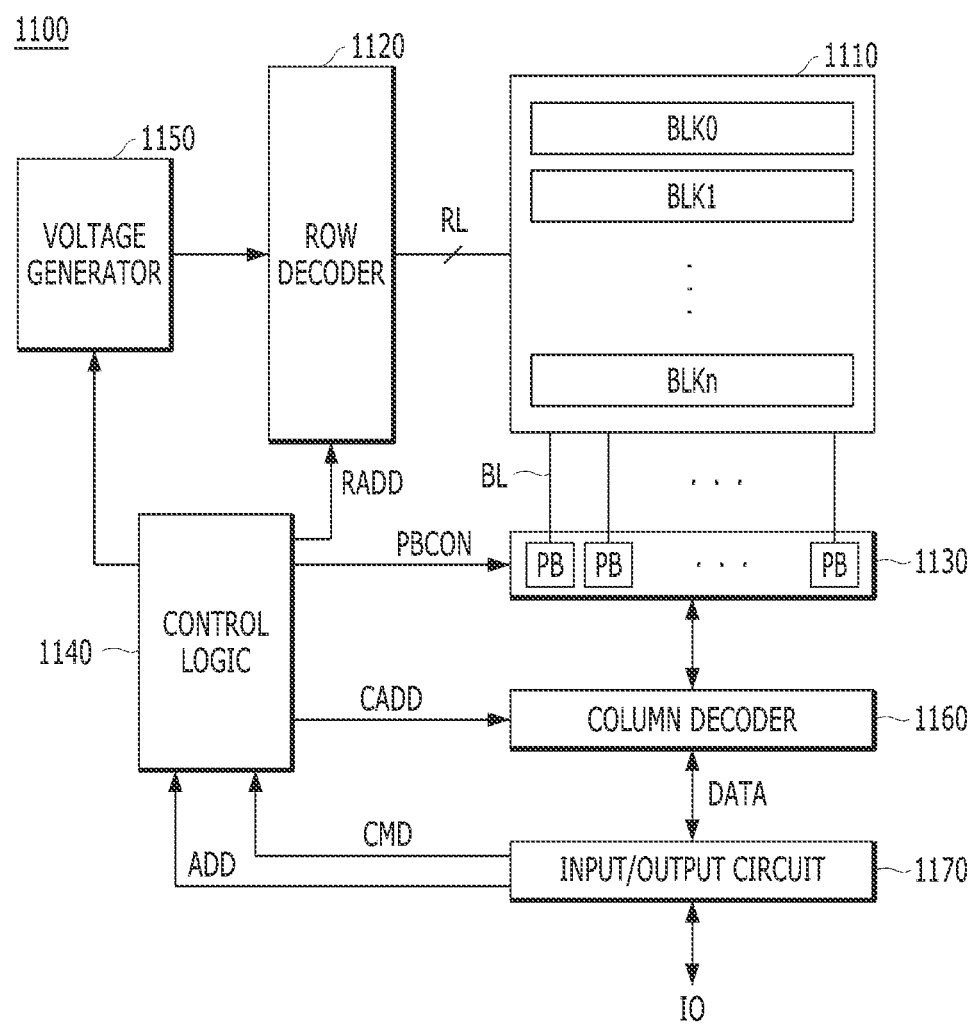
FIG. 11 is a diagram illustrating a configuration of a memory in accordance with an embodiment of the present disclosure.

FIG. 11 is a diagram illustrating a configuration of a memory 1100 in accordance with an embodiment of the present disclosure. The memory 1100 may perform a read operation through the methods described above with reference to FIGS. 5 to 10.

Referring to FIG. 11, the memory 1100 may include a cell array 1110, a row decoder 1120, a page buffer array 1130, a control logic 1140, a voltage generator 1150, a column decoder 1160, and an input/output circuit 1170.

The input/output circuit 1170 may communicate with a memory controller through input/output lines IO. For example, the input/output circuit 1170 may transfer commands CMD and addresses ADD, which are received through the input/output lines IO, to the control logic 1140, and transfer data DATA, which are received through the input/output lines IO, to the column decoder 1160. In addition, the input/output circuit 1170 may transmit the data DATA, which are transferred from the column decoder 1160, to the memory controller through the input/output lines IO during the read operation.

The cell array 1110 may include a plurality of memory blocks BLK0 to BLKn. Each of the memory blocks BLK0 to BLKn may include a plurality of memory strings. The memory blocks BLK0 to BLKn may be coupled to the row decoder 1120 through row lines RL. The memory blocks BLK0 to BLKn may be coupled to the page buffer array 1130 through bit lines BL. The row lines RL may include at least one drain selection line, a plurality of word lines, and at least one source selection line.

The row decoder 1120 may decode a row address RADD, which is transferred from the control logic 1140. The row address RADD may include information for selecting one of the memory blocks BLK0 to BLKn, where "n" is an integer greater than or equal to 1, and information for selecting one of the word lines. The row decoder 1120 may select one of the memory blocks BLK0 to BLKn. In addition, the row decoder 1120 may transfer an operating voltage, which is provided from the voltage generator 1150, to row lines of the selected memory block.

The page buffer array 1130 may include page buffer circuits PB coupled to the cell array 1110 through the bit lines BL. The page buffer circuits PB may operate as write drivers or sense amplifiers. The page buffer circuits PB may operate so that the data DATA transferred through the input/output circuit 1170 and the column decoder 1160 is programmed into the cell array 110 during a program operation, and may read data stored in selected memory cells through the bit lines BL and transfer the read data to the column decoder 1160 during the read operation.

The control logic 1140 may transfer the row address RADD among the addresses ADD received through the input/output circuit 1170 to the row decoder 1120, and transfer a column address CADD to the column decoder 1160. The control logic 1140 may control the page buffer array 1130 and the voltage generator 1150 to access the selected memory cells in response to the commands CMD received through the input/output circuit 1170. The control logic 1140 may generate a page buffer control signal PBCON for controlling the page buffer array 1130.

The voltage generator 1150 may generate various voltages required by the memory 1100. For example, the voltage generator 1150 may be configured to generate program voltages, pass voltages, read voltages, and the like.

In response to the column address CADD transferred from the control logic 1140, the column decoder 1160 may transfer the data DATA to the page buffer array 1130 during the program operation, and receive the data DATA from the page buffer array 1130 during the read operation.

Generally, the LSB, CSB, and MSB data stored in one memory cell are independently read and are included in different pages. In embodiments of the present disclosure, since the LSB, CSB, and MSB data stored in one memory cell can be read at once, the LSB, CSB, and MSB data stored in one memory cell may be included in the same page.

Figure 12:
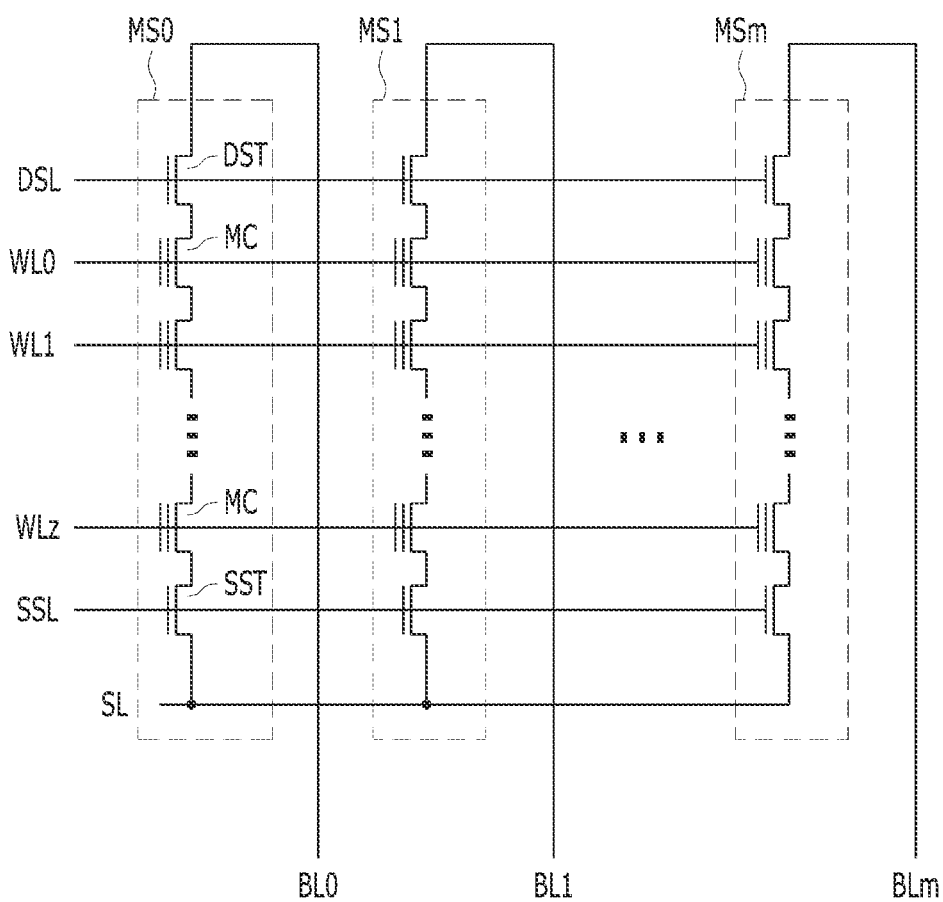
FIG. 12 is a diagram illustrating an example of a configuration of a memory block illustrated in FIG. 11.

FIG. 12 is a diagram illustrating an example of a configuration of a memory block BLKk, where "k" is an integer equal to or greater than 0 and less than or equal to "n", illustrated in FIG. 11.

Referring to FIG. 12, the memory block BLKk may include a plurality of memory strings MS0 to MSm coupled between bit lines BL0 to BLm, where "m" is an integer equal to or greater than 1, and a source line SL.

Each of the memory strings MS0 to MSm may include at least one source selection transistor SST, a plurality of memory cells MC, and at least one drain selection transistor DST, which are coupled in series to one another. The source selection transistor SST may be controlled by a source selection line SSL, and the drain selection transistor DST may be controlled by a drain selection line DSL. The memory cells MC may be controlled by word lines WL0 to WLZ, where "z" is an integer equal to or greater than 1.

Figure 13:
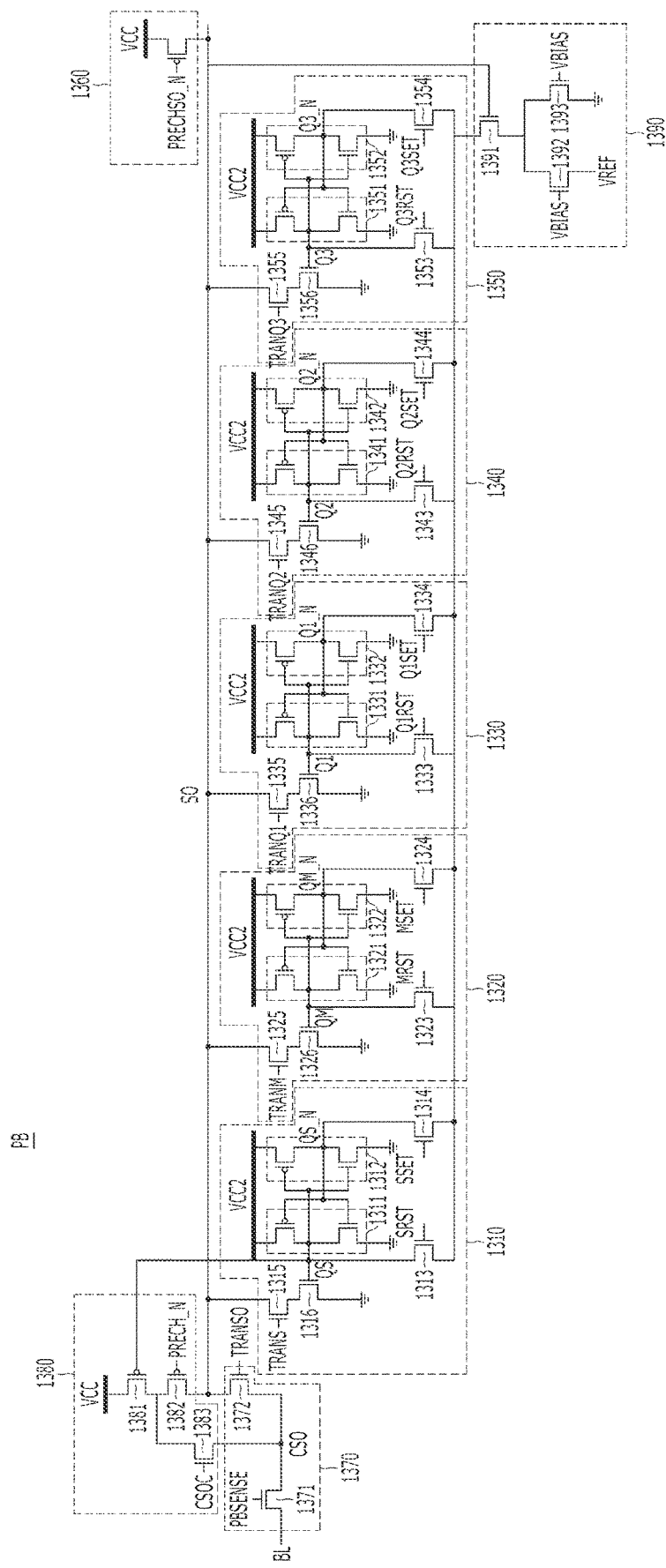
FIG. 13 is a diagram illustrating an example of a configuration of a page buffer circuit of a page buffer array illustrated in FIG. 11.

FIG. 13 is a diagram illustrating an example of a configuration of the page buffer circuit PB of the page buffer array 1130 illustrated in FIG. 11.

Referring to FIG. 13, the page buffer circuit PB may include sensing latches 1310 and 1320, data latches 1330, 1340 and 1350, a current sinking unit 1390, a sensing node pre-charge unit 1360, a bit line coupling unit 1370, and a bit line pre-charge unit 1380.

The sensing node pre-charge unit 1360 may pre-charge a sensing node SO by using a power supply voltage VCC when a sensing node pre-charge signal PRECHSO_N is activated to a low level.

The bit line coupling unit 1370 may control coupling between the bit line BL and the sensing node SO. The bit line coupling unit 1370 may include an NMOS transistor 1371 that controls coupling between the bit lines BL and an intermediate node CSO in response to a page buffer sensing signal PBSENSE, and an NMOS transistor 1372 that controls coupling between the intermediate node CSO and the sensing node SO in response to a first control signal TRANSO.

The bit line pre-charge unit 1380 may include PMOS transistors 1381 and 1382 and an NMOS transistor 1383. The PMOS transistors 1381 and 1382 may be coupled in series to each other between a power supply voltage terminal VCC and the sensing node SO. The PMOS transistor 1381 may be turned on or off according to a voltage level of a positive storage node QS of the first sensing latch 1310, and the PMOS transistor 1382 may be turned on or off in response to a second control signal PRECH_N. The NMOS transistor 1383 may be turned on or off according to a voltage level of a third control signal CSOC, and electrically couple a coupling node of the PMOS transistors 1381 and 1382 to the intermediate node CSO. The bit line pre-charge unit 1380 may pre-charge the intermediate node CSO, and pre-charge the bit line BL coupled to the intermediate node CSO by pre-charging of the intermediate node CSO.

The first sensing latch 1310 and the second sensing latch 1320 may be used to sense a voltage level of the sensing node SO. The first sensing latch 1310 and the second sensing latch 1320 may be used to sense the voltage level of the sensing node SO at different points in time during an evaluation period. Although it is described as an example that the page buffer circuit PB includes two sensing latches 1310 and 1320, the number of sensing latches of the page buffer circuit PB may vary according to the number of sensing operations performed during one evaluation period. For example, since the sensing operation is performed up to two times during one evaluation period in order to perform the read operation of FIG. 7, two sensing latches are required. However, since the sensing operation is performed up to three times during one evaluation period in order to perform the read operation of FIG. 8, three sensing latches may be required.

The first to third data latches 1330, 1340, and 1350 may be used to receive and store sensing results of the sensing latches 1310 and 1320. Although it is described as an example that the page buffer circuit PB includes three data latches 1330, 1340, and 1350, the number of data latches of the page buffer circuit PB may vary according to the number of bits of data stored in one memory cell. For example, when 3 bits of data is stored in one memory cell, three data latches are required, but when 4 bits of data is stored in one memory cell, four data latches may be required.

The latches 1310, 1320, 1330, 1340, and 1350 may include respective two inverters 1311 and 1312, 1321 and 1322, 1331 and 1332, 1341 and 1342, and 1351 and 1352 to which respective input/output terminals for data storage are coupled, respective reset transistors 1313, 1323, 1333, 1343, and 1353 for resetting data of respective positive storage nodes QS, QM, Q1, Q2, and Q3 to 0, respective set transistors 1314, 1324, 1334, 1344, and 1354 for setting data of respective negative storage nodes QS_N, QM_N, Q1_N, Q2_N, and Q3_N to 0, and respective two NMOS transistors 1315 and 1316, 1325 and 1326, 1335 and 1336, 1345 and 1346, and 1355 and 1356 for transferring the data stored in the positive storage nodes QS, QM, Q1, Q2, and Q3 to the sensing node SO.

The current sinking unit 1390 may allow a current for setting or resetting the latches 1310, 1320, 1330, 1340, and 1350 to sink. The current sinking unit 1390 may include an NMOS transistor 1391 for allowing the current to sink in response to the voltage level of the sensing node SO, and NMOS transistors 1392 and 1393 for allowing the current to sink from the NMOS transistor 1391 in response to a bias voltage VBIAS.

Adjustment of a trip point may be greatly important in order to sense the sensing node SO at two or more different times during one evaluation period to have the same effect as using different read voltages. To adjust the trip point, the latches 1310, 1320, 1330, 1340, and 1350 may use an independent power supply voltage VCC2, which is separated from the power supply voltage VCC, as a pull-up voltage. The trip point may be adjusted by adjusting a level of the power supply voltage VCC2. In addition, set or reset current amounts of the latches 1310, 1320, 1330, 1340, and 1350 may be adjusted by adjusting levels of a reference voltage VREF and the bias voltage VBIAS of the current sinking unit 1390, which may also allow the adjustment of the trip point.

Figure 14:
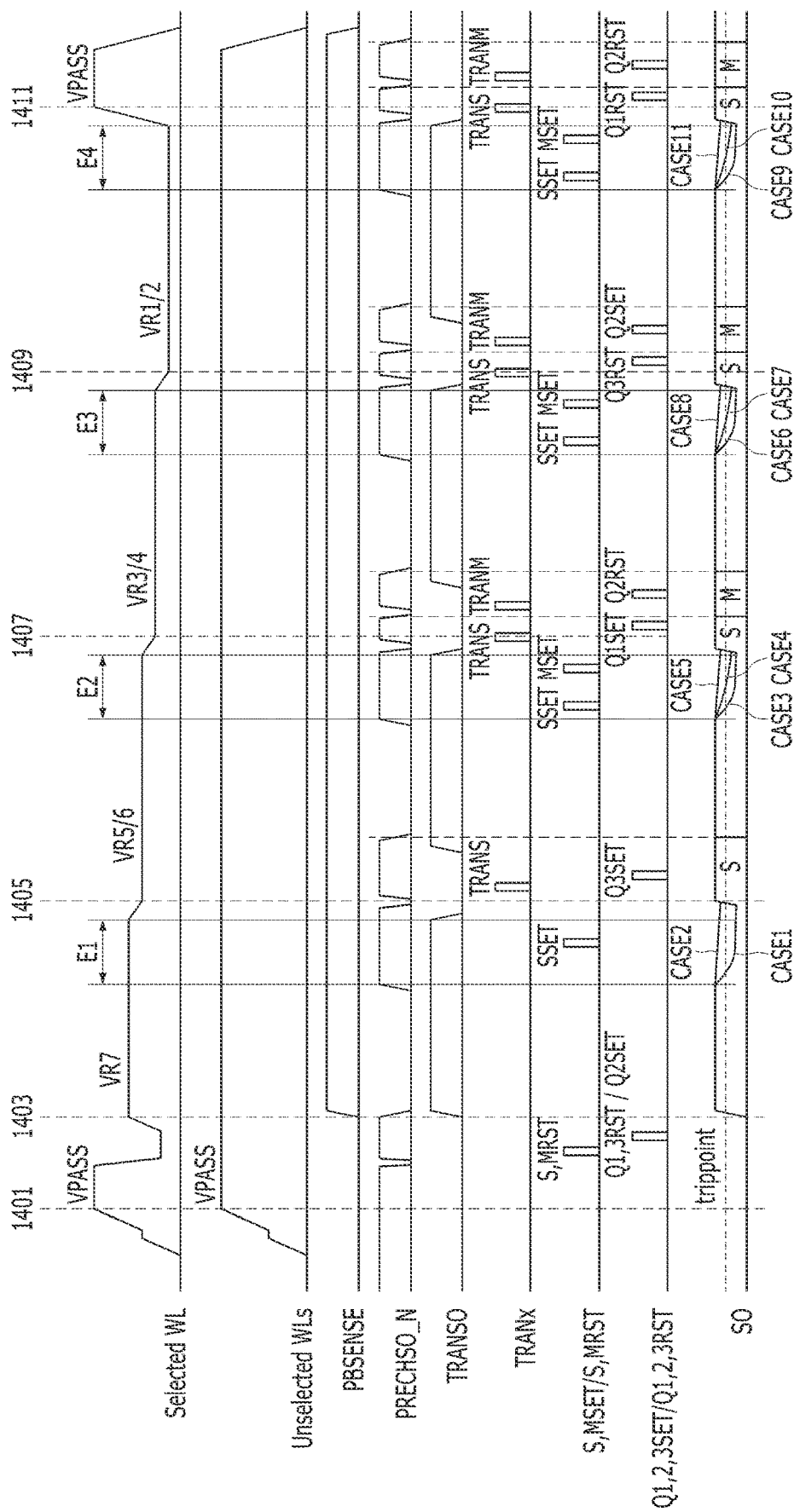
FIG. 14 is a timing diagram illustrating an operation of the page buffer circuit illustrated in FIG. 13.

FIG. 14 is a timing diagram illustrating an operation of the page buffer circuit PB illustrated in FIG. 13. In FIG. 14, the page buffer circuit PB performs the read operation of FIG. 7, and the operation of the page buffer circuit PB is described.

Referring to FIG. 14, a pass voltage VPASS may be applied to a selected word line Selected WL and unselected word lines Unselected WLs at a point in time 1401. Accordingly, a voltage level of a cell string may be initialized. After the point in time 1401, reset signals SRST and MRST of the sensing latches 1310 and 1320 may be activated, and consequently, the sensing latches 1310 and 1320 may be reset. Herein, when the sensing latches 1310 and 1320 become reset, the positive storage nodes QS and QM become to have a logical value of "0". In addition, reset signals Q1RST and Q3RST of the first data latch 1330 and the third data latch 1350 may be activated, and consequently, the first data latch 1330 and the third data latch 1350 may be reset. Since a set signal Q2SET of the second data latch 1340 is activated, the second data latch 1340 may be set as a result. Herein, when the second data latch 1340 becomes set, the positive storage node Q2 becomes a logical value of "1" and the negative storage node Q2_N becomes a logical value of "0".

At a point in time 1403, the seventh read voltage VR7 may be applied to the selected word line Selected WL. In this case, since the page buffer sensing signal PBSENSE and the first control signal TRANSO are activated, the bit line BL and the sensing node SO may be electrically coupled to each other. While the seventh read voltage VR7 has been applied to the selected word line Selected WL, the sensing node pre-charge signal PRECHSO_N may be deactivated from a low level to a high level, and a first evaluation period E1 may start. The voltage level of the sensing node SO may be the same as shown in case 1 CASE1 or case 2 CASE2 according to a threshold voltage of a selected memory cell during the first evaluation period E1. A set signal SSET of the first sensing latch 1310 may be activated during the first evaluation period E1. Since the current sinking unit 1390 supplies a sinking current to the first sensing latch 1310 according to the voltage level of the sensing node SO, the first sensing latch 1310 may or might not be set according to the voltage level of the sensing node SO. That is, the first sensing latch 1310 might not be set in case 1 CASE1, but the first sensing latch 1310 may be set in case 2 CASE2.

At a point in time 1405, a read voltage VR5/6 may be applied to the selected word line Selected WL. Then, a transmission signal TRANS of the first sensing latch 1310 may be activated, the sensing result of the first sensing latch 1310 in the first evaluation period E1 may be transferred to the sensing node SO (indicated by "S" in the graph of the sensing node SO), a set signal Q3SET of the third data latch 1350 may be activated, and the third data latch 1350 may or might not be set according to the voltage level of the sensing node SO, that is, according to the sensing result in the first evaluation period E1. That is, the sensing result of the first sensing latch 1310 in the first evaluation period E1 may be transferred to the third data latch 1350. Subsequently, the sensing node pre-charge signal PRECHSO_N may be deactivated from a low level to a high level, and a second evaluation period E2 may start. The voltage level of the sensing node SO may be the same as shown in case 3 CASE3, case 4 CASE4, or case 5 CASE5 according to the threshold voltage of the selected memory cell during the second evaluation period E2. During the second evaluation period E2, the set signal SSET of the first sensing latch 1310 may be first activated so that the voltage level of the sensing node SO may be sensed by the first sensing latch 1310. The first sensing latch 1310 might not be set in case 3 CASE3, but the first sensing latch 1310 may be set in case 4 CASE4 and case 5 CASE5. After the set signal SSET of the first sensing latch 1310 is activated, a set signal MSET of the second sensing latch 1320 may be activated so that the voltage level of the sensing node SO may be sensed by the second sensing latch 1320. The second sensing latch 1320 might not be set in case 3 CASE3 and case 4 CASE4, but the second sensing latch 1320 might be set in case 5 CASE5.

At a point in time 1407, a read voltage VR3/4 may be applied to the selected word line Selected WL. Then, the transmission signal TRANS of the first sensing latch 1310 may be activated, the sensing result of the first sensing latch 1310 in the second evaluation period E2 may be transferred to the sensing node SO (indicated by "S" in the graph of the sensing node SO), a set signal Q1SET of the first data latch 1330 may be activated, and the first data latch 1330 may or might not be set according to the voltage level of the sensing node SO. In addition, a transmission signal TRNM of the second sensing latch 1320 may be activated, the sensing result of the second sensing latch 1320 in the second evaluation period E2 may be transferred to the sensing node SO (indicated by "M" in the graph of the sensing node SO), a reset signal Q2RST of the second data latch 1340 may be activated, and the second data latch 1340 may or might not be reset according to the voltage level of the sensing node SO. That is, the sensing results in the second evaluation period E2 may be transferred to the first data latch 1330 and the second data latch 1340. Subsequently, the sensing node pre-charge signal PRECHSO_N may be deactivated from a low level to a high level, and a third evaluation period E3 may start. The voltage level of the sensing node SO may be the same as shown in case 6 CASE6, case 7 CASE7, or case 8 CASE8 according to the threshold voltage of the selected memory cell during the third evaluation period E3. During the third evaluation period E3, the set signal SSET of the first sensing latch 1310 may be first activated so that the voltage level of the sensing node SO may be sensed by the first sensing latch 1310. The first sensing latch 1310 might not be set in case 6 CASE6, but the first sensing latch 1310 may be set in case 7 CASE7 and case 8 CASE8. After the set signal SSET of the first sensing latch 1310 is activated, the set signal MSET of the second sensing latch 1320 may be activated so that the voltage level of the sensing node SO may be sensed by the second sensing latch 1320. The second sensing latch 1320 might not be set in case 6 CASE6 and case 7 CASE7, but the second sensing latch 1320 may be set in case 8 CASE8.

At a point in time 1409, a read voltage VR1/2 may be applied to the selected word line Selected WL. Then, the transmission signal TRANS of the first sensing latch 1310 may be activated, the sensing result of the first sensing latch 1310 in the third evaluation period E3 may be transferred to the sensing node SO (indicated by "S" in the graph of the sensing node SO), the reset signal Q3RST of the third data latch 1350 may be activated, and the third data latch 1350 may or might not be reset according to the voltage level of the sensing node SO. In addition, the transmission signal TRNM of the second sensing latch 1320 may be activated, the sensing result of the second sensing latch 1320 in the third evaluation period E3 may be transferred to the sensing node SO (indicated by "M" in the graph of the sensing node SO), a set signal Q2SET of the second data latch 1340 may be activated, and the second data latch 1340 may or might not be set according to the voltage level of the sensing node SO. That is, the sensing results in the third evaluation period E3 may be transferred to the third data latch 1350 and the second data latch 1340. Subsequently, the sensing node pre-charge signal PRECHSO_N may be deactivated from a low level to a high level, and a fourth evaluation period E4 may start. The voltage level of the sensing node SO may be the same as shown in case 9 CASE9, case 10 CASE10, or case 11 CASE11 according to the threshold voltage of the selected memory cell during the fourth evaluation period E4. During the fourth evaluation period E4, the set signal SSET of the first sensing latch 1310 may be first activated so that the voltage level of the sensing node SO may be sensed by the first sensing latch 1310. The first sensing latch 1310 might not be set in case 9 CASE9, but the first sensing latch 1310 may be set in case 10 CASE10 and case 11 CASE11. After the set signal SSET of the first sensing latch 1310 is activated, the set signal MSET of the second sensing latch 1320 may be activated so that the voltage level of the sensing node SO may be sensed by the second sensing latch 1320. The second sensing latch 1320 might not be set in case 9 CASE9 and case 10 CASE10, but the second sensing latch 1320 may be set in case 11 CASE11.

At a point in time 1411, the pass voltage VPASS may be applied to the selected word line Selected WL. Then, the transmission signal TRANS of the first sensing latch 1310 may be activated, the sensing result of the first sensing latch 1310 in the fourth evaluation period E4 may be transferred to the sensing node SO (indicated by "S" in the graph of the sensing node SO), the reset signal Q1RST of the first data latch 1330 may be activated, and the first data latch 1330 may or might not be reset according to the voltage level of the sensing node SO. In addition, the transmission signal TRNM of the second sensing latch 1320 may be activated, the sensing result of the second sensing latch 1320 in the fourth evaluation period E4 may be transferred to the sensing node SO (indicated by "M" in the graph of the sensing node SO), the reset signal Q2RST of the second data latch 1340 may be activated, and the second data latch 1340 may or might not be reset according to the voltage level of the sensing node SO.

Through this process, the MSB data of the selected memory cell may be stored in the first data latch 1330, the CSB data of the selected memory cell may be stored in the second data latch 1340, and the LSB data of the selected memory cell may be stored in the third data latch 1350. Through the operations described with reference to FIG. 14, four read voltages VR7, VR5/6, VR3/4, and VR1/2 may be used, the 3 bits of data stored in the memory cell may be read through fourth evaluations E1 to E4 and seven sensing operations.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. A page buffer circuit comprising:
   a sensing node;
   a first sensing latch configured to sense and store a voltage level of the sensing node at a first time point during an evaluation period of evaluating the sensing node according to a voltage level of a bit line;
   a second sensing latch configured to sense and store the voltage level of the sensing node at a second time point during the evaluation period; and
   a pre-charge unit configured to pre-charge the sensing node before the evaluation period,
   wherein the pre-charge unit is configured to use a first power supply voltage to pre-charge the sensing node, and the first and second sensing latches are each configured to use a second power supply voltage having a different voltage level from the first power supply voltage, and
   wherein a voltage level of the second power supply voltage is adjustable.

2. The page buffer circuit of claim 1, further comprising a plurality of data latches configured to receive and store results of the sensing the first and second sensing latches.

3. The page buffer circuit of claim 1, wherein a cell string including a plurality of memory cells is coupled to the bit line, a read voltage is applied to a selected word line corresponding to a selected memory cell among the plurality of memory cells during the evaluation period, and a pass voltage is applied to unselected word lines corresponding to unselected memory cells among the plurality of memory cells.

4. A page buffer circuit comprising:
   a sensing node;
   a first sensing latch configured to sense and store a voltage level of the sensing node at a first time point during an evaluation period of evaluating the sensing node according to a voltage level of a bit line;
   a second sensing latch configured to sense and store the voltage level of the sensing node at a second time point during the evaluation period;
   a pre-charge unit configured to pre-charge the sensing node before the evaluation period; and
   a current sinking unit configured to allow a set current and a reset current of the first and second sensing latches to sink,
   wherein the pre-charge unit is configured to use a first power supply voltage to pre-charge the sensing node, and the first and second sensing latches are each configured to use a second power supply voltage having a different voltage level from the first power supply voltage, and wherein at least one of a voltage level of the second power supply voltage and a current amount of the current sinking unit is adjustable.

5. A read operation method of a memory, the read operation method comprising:
   applying a first read voltage to a selected word line corresponding to a memory cell selected from a cell string;
   applying a pass voltage to unselected word lines corresponding to memory cells unselected from the cell string;
   a first evaluation operation of evaluating a sensing node according to a voltage level of a bit line connected to the cell string;
   a first sensing operation of sensing a voltage level of the sensing node during the first evaluation operation;
   transmitting a result of the first sensing operation to a first data latch;
   applying a second read voltage different from the first read voltage to the selected word line;
   pre-charging the sensing node;
   a second evaluation operation of evaluating the sensing node according to the voltage level of the bit line;
   a second sensing operation of sensing the voltage level of the sensing node during the second evaluation operation;
   a third sensing operation of sensing the voltage level of the sensing node at a different point in time from the second sensing operation during the second evaluation operation;
   transmitting a result of the second sensing operation to a second data latch; and
   transmitting a result of the third sensing operation to a third data latch.

6. The read operation method of claim 5, further comprising:
   applying a third read voltage different from the first and second read voltages to the selected word line;
   pre-charging the sensing node;
   a third evaluation operation of evaluating the sensing node according to the voltage level of the bit line;
   a fourth sensing operation of sensing the voltage level of the sensing node during the third evaluation operation;
   a fifth sensing operation of sensing the voltage level of the sensing node at a different point in time from the fourth sensing operation during the third evaluation operation;
   transmitting a result of the fourth sensing operation to the first data latch; and
   transmitting a result of the fifth sensing operation to the third data latch.

7. The read operation method of claim 6, further comprising:
   applying a fourth read voltage different from the first to third read voltages to the selected word line;
   pre-charging the sensing node;
   a fourth evaluation operation of evaluating the sensing node according to the voltage level of the bit line;
   a sixth sensing operation of sensing the voltage level of the sensing node during the fourth evaluation operation;
   a seventh sensing operation of sensing the voltage level of the sensing node at a different point in time from the sixth sensing operation during the fourth evaluation operation;
   transmitting a result of the sixth sensing operation to the second data latch; and transmitting a result of the seventh sensing operation to the third data latch.

8. The read operation method of claim 7, further comprising transmitting data stored in the first to third data latches to a memory controller.

9. The read operation method of claim 7, wherein:

the transmitting the result of the first sensing operation to the first data latch includes setting the first data latch according to the result of the first sensing operation, the transmitting the result of the second sensing operation to the second data latch includes setting the second data latch according to the result of the second sensing operation, the transmitting the result of the third sensing operation to the third data latch includes resetting the third data latch according to the result of the third sensing operation, the transmitting the result of the fourth sensing operation to the first data latch includes resetting the first data latch according to the result of the fourth sensing operation, the transmitting the result of the fifth sensing operation to the third data latch includes setting the third data latch according to the result of the fifth sensing operation, the transmitting the result of the sixth sensing operation to the second data latch includes resetting the second data latch according to the result of the sixth sensing operation, and the transmitting the result of the seventh sensing operation to the third data latch includes resetting the third data latch according to the result of the seventh sensing operation.

10. The read operation method of claim 7, wherein data stored in the first to third data latches are included in the same page.

\* \* \* \* \*